April 21, 1959      E. L. DAVEY      2,882,677
MANUFACTURE OF MULTI-CORE ELECTRIC CABLES
Filed Oct. 10, 1956
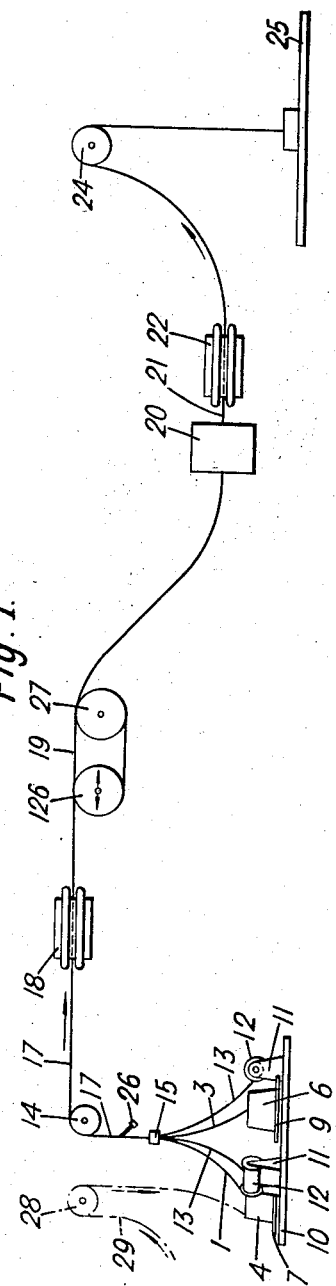
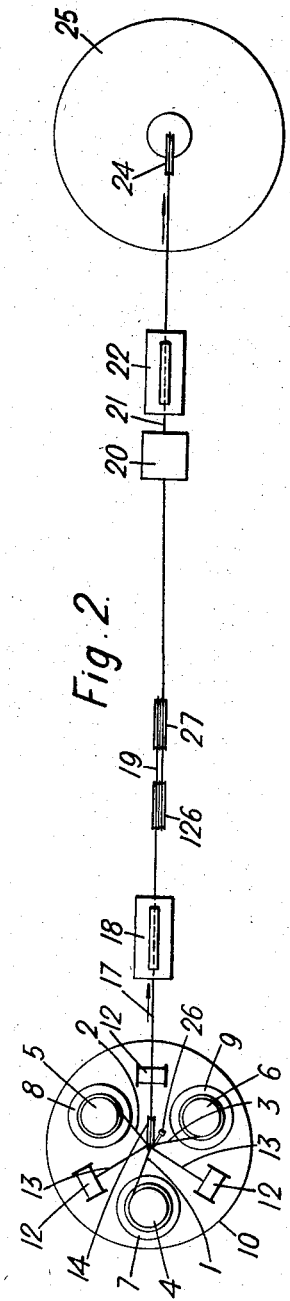
Inventor
Edward Leslie Davey
By
Hoopes, Leonard & Buell
his Attorneys United States Patent Office 2,882,677
Patented Apr. 21, 1959

2,882,677

MANUFACTURE OF MULTI-CORE ELECTRIC CABLES

Edward Leslie Davey, Hale, England, assignor to British Insulated Callender's (Submarine Cables) Limited, London, England, a British company Application October 10, 1956, Serial No. 615,181

Claims priority, application Great Britain October 11, 1955

11 Claims. (Cl. 57—156)

This invention relates to the manufacture of multi-core electric cables and by the term "multi-core electric cable" we mean a cable comprising two or more cores which each comprise an insulated electric conductor and which are laid up helically around a central axis.

The manufacture of such cable involves making the necessary number of insulated electric conductors of the required length and laying them up helically together about a common axis. To this end it is the practice for the various insulated conductors to be laid up to be coiled on drums which are mounted in a rotatable frame by which they are carried bodily around the cable axis or core as their conductors are drawn off and pulled through a closing die by means of a haul-off capstan or other cable-advancing means. Where the conductors are power cable conductors of non-circular cross-section and of pre-spiralled form, the drums carried in the laying-up machine are given "back-rotation" to avoid imparting a 360° twist to the insulated conductors during each revolution of the machine.

It will be appreciated that the size and cost of such laying up machinery becomes very great in the case of lengths of super-tension power cable of more than a few hundred yards or metres in length and prohibitive in the case of super-tension power cables which require to be manufactured in very long lengths, by which we mean lengths of the order of several miles or kilometres or more. The same may be true of telecommunication cables comprising a number of helically extending co-axial conductors.

By the present invention I provide a novel method of and apparatus for manufacturing very long lengths of multi-core cable.

In accordance with my invention, the insulated conductors, hereinafter for the sake of brevity referred to as cable cores, are separately coiled down on a support surface that is capable of rotation about a vertical axis, e.g. a power-driven turntable. After the whole length of each core has been coiled down, the cores are withdrawn upwards as the support surface is rotated and are brought together to form a group of cores which is coiled down upon a second support surface which may or may not be capable of rotation.

To ensure a close assembly of the cores it will generaly be preferable to pass them through a closing die mounted above the rotatable support surface on which the cable cores are separately coiled down. The cores may be drawn from their coils and through the closing die by any suitable form of haul-off means such as a capstan wheel or a caterpillar type of haul-off by which we mean a group of two or more endless travelling belts extending in the direction of and disposed about the group of laid up cores and arranged to grip the peripheral surface of the group with their forwardly moving sides, one or more of the belts being driven other than by engagement with the advancing group.

The rotation of the support surface on which the cores are separately coiled down causes the cores to be laid up helically together as they are withdrawn from their respective coils and brought together to form a group, the length of lay so imparted being dependent upon the linear speed of withdrawal of the cores and the speed of rotation of the support surface.

Where the support surface on which each core is coiled down is a stationary surface, the operation of coiling down will put an axial twist into the core which is removed when the core is drawn off again. On the other hand, rotation of the turntable or other surface carrying the coils of core during the laying up operation will cause an axial twist to be put into each core. Where it is undesirable for the cores in the cable resulting from the laying up operation to have in them residual axial twist, the introduction of such residual twist during the laying up operation may be avoided by rotating each laid down coil of core about its axis during such operation at the same angular speed as but in the opposite sense to the angular speed of rotation of the surface supporting the coils of core. To this end the support surface for the several coils of core may consist of a main turntable on which are mounted a number of auxiliary turntables—one for each core—each being capable of being driven at a speed and in a direction independent of the speed and direction of drive of the main turntable on which it is supported. These auxiliary turntables are preferably uniformly distributed about the axis of the main turntable but this is not essential: they may be concentrically arranged relative to one another and to the main table.

During the operations of coiling down the several core lengths, the main turntable and the auxiliary turntables would be held stationary and during the cabling or laying up operation they would be given "back-rotation." Alternatively, during the operation of coiling down the separate cores on their respective auxiliary turntables, the main turntable being held stationary, the auxiliary turntables may be driven at such a speed and in such a direction that the operation of coiling down imparts to the core an axial twist approximating in value but of opposite sign to the algebraic sum of the axial twist that would be taken out by the action of drawing off core from the coil if it were to be held stationary and the axial twist put into the core by the rotation of the main turntable on which the auxiliary turntables are mounted. When this is done the auxiliary turntables can be locked against rotation relative to the main turntable during rotation of the main turntable.

The appropriate speed of the auxiliary turntable for a given speed of the main turntable can be readily determined as follows:

The axial twist imparted to the core during coiling down is given by $$L_1 = \frac{2\pi r}{1 + \frac{2\pi r \omega 1}{V_1}}$$

where $L_1$ is the pitch length of the twist in feet, $r$ is the radius at which coiling down is taking place, $\omega 1$ is the speed of the auxiliary turntable in r.p.m. and is considered positive when in the same direction as the travel of the cable during coiling down and $V_1$ is linear speed in feet per minute at which core is fed to the auxiliary turntable. During the subsequent laying up operation the axial twist put in per turn of coil drawn off is $$\frac{2\pi r}{V_2} \omega 2 - 1$$

and the lay $$L_2 = \frac{2\pi r}{\frac{2\pi r \omega 2 - 1}{V_2}}$$

where $V_2$ is the linear speed of withdrawal of the core in feet/min., $r$ the radius of the turn being withdrawn and $\omega 2$ the speed of rotation in r.p.m. of the main turntable. Since for zero residual twist $$L_1 + L_2 = 0$$

we have $$\omega 1 = \frac{V_1}{V_2} \cdot \omega 2$$

Such a method of operation permits of the drive to the auxiliary turntables being mounted below the main table and brought into driving engagement when the main turntable is stationary with each auxiliary turntable axially in alignment with or otherwise appropriately positioned relative to its driving means.

The second support surface upon which the cable cores are coiled down may also be a turntable in which case it may be rotated at such a speed and in such a direction that the cabled cores become coiled on the turntable without any axial twist being put into or taken out of them. Naturally such speed will vary with the speed of approach of the cable and the radius at which coiling down is taking place. Alternately it may be held stationary during the coiling down of the cable or be rotated in the direction of coiling down at such a speed as will reduce the length of cable lay to a desired extent (by imparting one or more than one twist to the cable during the coiling down of each complete turn) thus in effect subjecting the cores to a second laying up operation, which second operation is of the kind described in the specification of our co-pending application Serial No. 615,182.

After being laid up helically together but before they are coiled down as a group upon the second support surface, the laid up cores may be provided with a gas- or liquid-tight sheath of metallic or non-metallic material. This may be a seamless sheath applied by extrusion or it may be a seamed sheath formed by one or more helically and/or longitudinally applied tapes of metal or plastic. To take care of minor differences between the speed at which the laid up cores are drawn through the closing die and the speed with which they pass through the extrusion press or other sheath-applying device, the group of laid up cores may pass through a storage device on its way from the closing die to the sheath-applying device. Such a device may consist of two sets of pulleys one of which is movable to or from the other.

The invention will be further described by way of example in connection with the manufacture of a 3-core cable and with reference to the accompanying diagrammatic drawings, wherein:

Figure 1 is a side view of the arrangements for combining the cores into a single cable; and Figure 2 is a plan of the arrangements shown in Figure 1.

In the drawings, the individual cable cores and the combined group of cores are indicated diagrammatically as single lines and the direction of their movement through the apparatus is indicated by the arrows.

The three cores 1, 2, 3 which are to be combined into a single cable are arranged in three separate coils 4, 5, 6 on three auxiliary turntables 7, 8, 9. The three turntables 7, 8, 9 are mounted, for rotation about vertical axes, on a main turntable 10 which is also rotatable about a vertical axis. The main and auxiliary turntables are provided with independently variable and reversible drives. The auxiliary turntables are arranged symmetrically about the axes of the main turntable. There are also mounted symmetrically on the main turntable three supports 11 for reels 12 of inter-core fillers 13, each of the reels 12 being supported for rotation about a horizontal axis between two auxiliary turntables.

Centrally above the group of turntables there is supported a sheave 14 with its axis horizontal. Below the sheave and in vertical alignment with the main turntable axis there is mounted a closing die 15. In between the sheave 14 and die 15 there is provided, for rotation about the same vertical axis, a taping head 26. In operation, the cores 1, 2, 3 and fillers 13 are drawn upwards, from the auxiliary turntables and reels, through the die 15 in which they are assembled into a close group. At the same time the main turntable 10 is rotated so that at the die the cores and fillers are twisted together into a laid up group of substantially circular section. The taping head 26 applies a helical wrapping of an appropriate tape about the group to bind the component parts together. Thereafter the core-group 17 is drawn over the sheave 14 from which it passes along a substantially horizontal path. The cores are drawn from the auxiliary turn-tables, through the die and over the sheave by a caterpillar haul-off 18. This haul-off consists of a number of endless belts extending in the direction of, and disposed about, the core-group 17, and arranged to grip the peripheral surface of the group with their forwardly moving sides. Some of the belts are driven, other than by engagement with the advancing group, so that the required motion of the group is obtained. From the haul-off 18 the core-group 17 is fed through a storage mechanism 19 to a continuously operable lead press 20 which applies to it an external lead sheath. The lead covered cable 21 is drawn from the lead press 20 by a caterpillar haul-off 22, of similar form to the first haul-off 18, but having a slipping overdrive which prevents any twisting of the cable 21. From the haul-off 22 the cable passes to a driven sheave 24 mounted for rotation on a horizontal axis and vertically over the centre of a flat turntable 25. The turntable 25 can be driven for rotation about its vertical axis.

The storage mechanism 19 takes care of minor differences between the speed at which the cores 1, 2 and 3 are drawn through the closing die 15 and the speed with which the core-group 17 passes through the extrusion press 20. It consists of two sets 126, 27 of grooved pulleys mounted in alignment with the path of the core-group, the axes of the pulleys extending in a horizontal plane and transversely to the general direction of movement of the core-group. One (126) of the sets is movable to and from the other, as indicated by the double-ended arrow, as the rate of movement of the core-group from the storage mechanism is greater or less than that of its movement towards the mechanism.

During the process of coiling down the lead-sheathed cabe 21 on the final turntable 25, this is normally rotated at such a speed and in such a direction that there is no tendency to twist the cable. The drive to this turntable is variable with the speed of approach of the cable over the driven sheave 24 and with the radius at which coiling down is taking place.

The cores to be laid up can be coiled on to the auxiliary turntables 7, 8 and 9 by bringing each in turn beneath a driven sheave 28 as shown in broken line in Figure 1. In the instance shown the auxiliary turntable 7 is beneath the sheave 28 in the position which it would occupy to receive a core represented by the broken line 29. Each auxiliary turntable is brought into the required loading position by moving the main turntable 10 and locking it in position. As indicated previously in this specification, the auxiliary turntables may or may not be rotated individually during the coiling of the cores on the turntables and may or may not be rotated independently of the main turntable 10 during the laying up operation. The method which is used is dependent upon the conditions which are determined by the nature of the cable.

Referring to the calculations which are set out earlier in this specification, it will be seen that the conditions for zero residual twist in the cores of the laid-up core-group can be obtained by rotating each of the auxiliary turntables 7, 8 and 9 on its axis during the process of coiling on it a length of core, the main table 10 being held stationary, and by locking each auxiliary turntable 7, 8 and 9 against rotation relative to the main turntable 10 when this is rotating during the laying up operation. To meet this circumstance there can be provided a single drive for the auxiliary turntables, this drive being located beneath the main turntable 10 and in such a position that it can be brought into position to receive a core. Thus in the position shown in the drawings, such a driving device may be provided in such a situation that it will drive a turntable which is located in the position occupied by the auxiliary turntable 7.

The invention is especially useful for laying up long lengths of core to form super-tension gas-filled 3-core pre-impregnated paper insulated cable having a length of several miles but it is also applicable to other kinds of power cable, for example of mass impregnated paper insulated cables of the non-draining type and to cables having a dielectric built up of lappings of polystyrene or polyethylene or other plastic film. It may also be applied to the manufacture of long lengths of multi-core cables of the kind in which each core is separately lead sheathed. The invention may also be applied to the manufacture of very long lengths of multicore rubber insulated power cables by coiling down on to the main turntable two or more rubber insulated conductors as they issue from a corresponding number of continuous vulcanising machines. It may also be used to cable together a number of co-axial cores to form a multi-core telecommunication cable for submarine or other purposes where it is an advantage to have a very long length of cable free from joints.

What I claim as my invention is:

1. A method of manufacturing a multi-core electric cable comprising separately coiling down the cable cores on a core supporting surface capable of rotation about a vertical axis, rotating the core supporting surface while withdrawing the cores upwardly therefrom and bringing them together to form a helically laid-up group of cores, and coiling down the helically laid-up group of cores upon a final supporting surface.

2. A method of manufacturing a multi-core electric cable comprising separately coiling down the cable cores on a core supporting surface capable of rotation about a vertical axis, rotating the core supporting surface while withdrawing the cores upwardly therefrom and through a closing die, which is mounted above the supporting surface, to bring the cores together to form a helically laid-up group of cores, and coiling down the helically laid-up group of cores upon a final supporting surface.

3. A method as claimed in claim 1, in which the core supporting surface is stationary during the coiling down of the cores thereon.

4. A method of manufacturing a multi-core electric cable comprising coiling down each cable core separately on a core supporting surface which is rotatable about a vertical axis, the core supporting surfaces corresponding in number with the number of cores and being mounted on a common supporting member which is rotatable about a vertical axis, withdrawing the cores upwardly while the common supporting member is rotated to carry the core supporting surfaces around its axis, bringing the cores together into a helically laid-up group as they are withdrawn, and coiling down the helically laid-up group of cores upon a final supporting surface.

5. A method of manufacturing a multi-core electric cable comprising coiling down each cable core separately on a core supporting surface which is rotatable about a vertical axis, the core supporting surfaces corresponding in number with the number of cores and being mounted on a common supporting member which is rotatable about a vertical axis, withdrawing the cores upwardly while the common supporting member is rotated to carry the core supporting surfaces around its axis, bringing the cores together into a helically laid up group as they are withdrawn and coiling down the helically laid-up group of cores, upon a final supporting surface, each core supporting surface and the common supporting member being held against rotation during the coiling down of the cores, and each core supporting surface being rotated on its axis relative to the common supporting member at the same angular speed as, and in the opposite direction to, the common supporting member during the upward withdrawal of the cores.

6. A method of manufacturing a multi-core electric cable comprising coiling down each cable core separately on a core supporting surface which is rotatable about a vertical axis, the core supporting surfaces corresponding in number with the number of cores and being mounted on a common supporting member which is rotatable about a vertical axis, withdrawing the cores upwardly while the common supporting member is rotated to carry the core supporting surface around its axis, bringing the cores together into a helically laid up group as they are withdrawn and coiling down the helically laid-up group of cores upon a final supporting surface, each core supporting surface being rotated about its axis as a core is coiled down thereon and being stationary in relation to the common supporting member as the cores are withdrawn.

7. A method of manufacturing a multi-core electric cable comprising coiling down each cable core separately at a linear speed $V_1$ on a core supporting surface which is rotated with an angular velocity $\omega 1$ about a vertical axis, the core supporting surfaces corresponding in number with the number of the cores and being mounted on a common support which is rotatable about a vertical axis and is held stationary during the coiling down of each core, withdrawing the cores upwardly at a linear speed $V_2$ while rotating the common support at an angular velocity of $\omega 1$. $V_2/V_1$ and holding the core supporting surfaces stationary in relation to the common support, and bringing the cores together into a helically laid-up group as they are withdrawn, and coiling down the helically laid-up group of cores upon a final support surface.

8. A method of manufacturing a multi-core electric cable, comprising separately coiling down the cable cores on a core supporting surface capable of rotation about a vertical axis, rotating the core supporting surface while withdrawing the cores upwardly therefrom and bringing them together to form a helically laid-up group of cores, and coiling down the helically laid-up group of cores upon a final stationary supporting surface which is capable of rotation about a vertical axis.

9. A method of manufacturing a multi-core electric cable, comprising separately coiling down the cable cores on a core supoprting surface capable of rotation about a vertical axis, rotating the core supporting surface while withdrawing the cores upwardly therefrom and bringing them together to form a helically laid-up group of cores, and coiling down the helically laid-up group of cores upon a final supporting surface, while rotating the final supporting surface about a vertical axis at such a speed and in such a direction that the helical lay of the cores in the group is not substantially altered by the coiling down of the group.

10. A method of manufacturing a multi-core electric cable, comprising separately coiling down the cable cores on a core supporting surface capable of rotation about a vertical axis, rotating the core supporting surface while withdrawing the cores upwardly therefrom and bringing them together to form a helically laid-up group of cores, and coiling down the helically laid-up group of cores upon a final supporting surface while rotating the final supporting surface about a vertical axis in a direction, and at a speed, to reduce the length of helical lay of the cores in the group.

11. A method of manufacturing a multi-core electric cable, comprising separately coiling down the cable cores on a core supporting surface capable of rotation about a vertical axis, rotating the core supporting surface while withdrawing the cores upwardly therefrom and through a closing die, which is mounted above the core supporting surface to bring the cores together to form a helically laid-up group of cores, applying a fluid-tight sheath about the group of cores by drawing the group of cores in succession through a variable storage device to compensate for differences between the speeds of entry of the group to and exit of the group from the storage device, and through a sheath-applying device, and coiling down the sheathed helically laid-up group of cores upon a final supporting surface.

References Cited in the file of this patent

UNITED STATES PATENTS

| | | |
|---|---|---|
| 4,714 | Newall | Aug. 26, 1846 |
| 2,130,394 | Klein | Sept. 20, 1938 |
| 2,191,875 | Astley | Feb. 27, 1940 |
| 2,427,507 | Powell | Sept. 16, 1947 |
| 2,546,465 | Martini | Mar. 27, 1951 |